(12) United States Patent
Perger

(10) Patent No.: US 8,743,489 B2
(45) Date of Patent: Jun. 3, 2014

(54) PORRO PRISM

(76) Inventor: Andreas Perger, Vienna (AT)

( * ) Notice: Subject to any disclaimer, the term of this patent is extended or adjusted under 35 U.S.C. 154(b) by 104 days.

(21) Appl. No.: 13/309,665

(22) Filed: Dec. 2, 2011

(65) Prior Publication Data

US 2012/0140349 A1 Jun. 7, 2012

(30) Foreign Application Priority Data

Dec. 7, 2010 (AT) .................................. 2028/2010

(51) Int. Cl.
*G02B 5/04* (2006.01)

(52) U.S. Cl.
USPC ........................................................ 359/835

(58) Field of Classification Search
CPC ......... G02B 5/04; G02B 5/045; G02B 17/023
USPC ................................................. 359/833–836
See application file for complete search history.

(56) References Cited

U.S. PATENT DOCUMENTS

| | | | | | |
|---|---|---|---|---|---|
| 1,795,782 | A | * | 3/1931 | Konig | 359/835 |
| 2,087,329 | A | * | 7/1937 | Ott | 359/376 |
| 2,660,090 | A | * | 11/1953 | Leitz, Jr. et al. | 359/375 |
| 3,424,516 | A | * | 1/1969 | Snyder | 359/834 |
| 4,469,404 | A | * | 9/1984 | Taira | 359/834 |
| 5,072,313 | A | * | 12/1991 | Schweitzer et al. | 359/529 |
| 5,721,979 | A | | 2/1998 | Takato et al. | |
| 6,057,963 | A | | 5/2000 | Hirunuma et al. | |
| 6,292,314 | B1 | * | 9/2001 | Perger | 359/834 |
| 7,714,994 | B2 | * | 5/2010 | Molitor et al. | 356/218 |
| 2003/0223132 | A1 | * | 12/2003 | Seifert | 359/833 |

FOREIGN PATENT DOCUMENTS

| | | |
|---|---|---|
| DE | 19855702 A1 | 6/1999 |
| JP | 09133868 A * | 5/1997 |
| JP | 11064738 A | 3/1999 |

OTHER PUBLICATIONS

Austrian Search Report for Austrian Patent Application No. A 2028/2010 dated Sep. 22, 2011.

* cited by examiner

*Primary Examiner* — Euncha Cherry
(74) *Attorney, Agent, or Firm* — Hoffmann & Baron, LLP

(57) ABSTRACT

The invention pertains to a Porro prism of the second type, with at least two interconnected reversing prisms that each provide two reflective inclined surfaces for a beam path between an entry surface and an exit surface, wherein the exit surface of one reversing prism and the entry surface of the other reversing prism form their respective connecting surface, and wherein the inventive Porro prism is characterized in that the connecting surface lies oblique to the optical axes of those sections of the beam path that penetrate the exposed entry and exit surfaces of the reversing prisms.

8 Claims, 4 Drawing Sheets

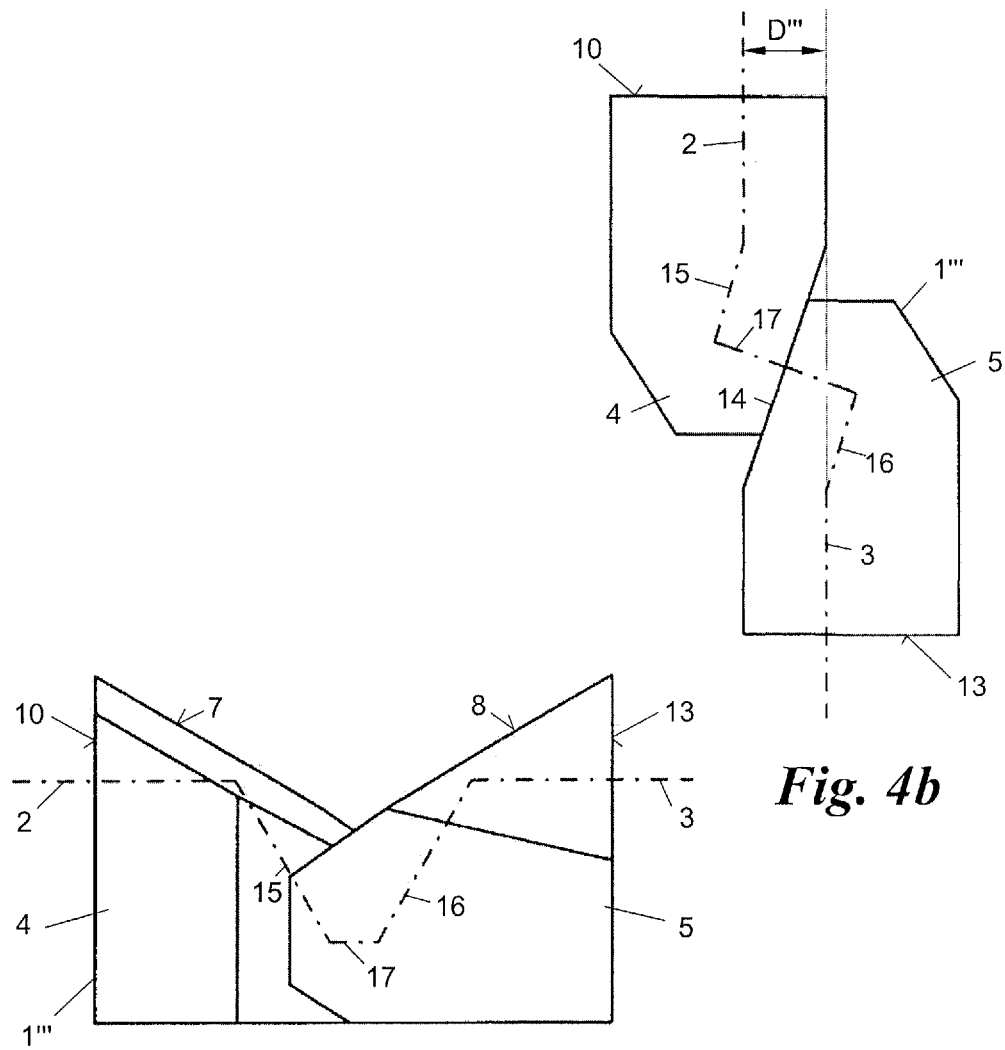
*Fig. 4b*
*Fig. 4c*
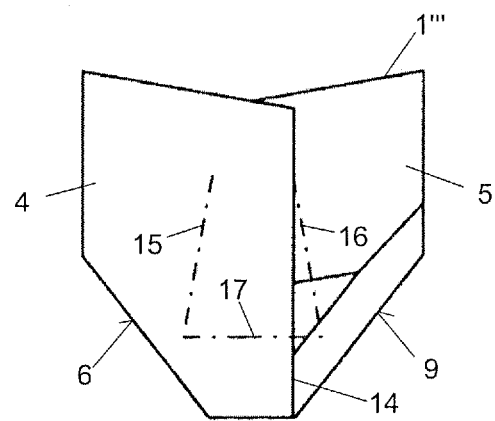
*Fig. 4a*

PORRO PRISM

CROSS-REFERENCE TO RELATED APPLICATION(S)

This application claims priority to Austrian Patent Application No. A 2028/2010 filed on Dec. 7, 2010, the contents of which are hereby expressly incorporated by reference.

FIELD OF THE INVENTION

The present invention pertains to a Porro prism of the second type having at least two interconnected reversing prisms that each provide two reflective inclined surfaces for the beam path between an entry surface and an exit surface, wherein the exit surface of one reversing prism and the entry surface of the other reversing prism form their respective connecting surface.

BACKGROUND

Porro prisms are named after their inventor Ignazio Porro and represent classic reversing systems for binoculars, telescopes, etc. A complete image inversion, i.e., horizontally as well as vertically, is achieved due to the quadruple beam deflection. In comparison with other reversing prisms such as, for example, Uppendahl prisms, Schmidt-Pechan prisms or Abbe-König prisms, Porro prisms have extremely low losses due to the small number of reflections and can be cost-efficiently manufactured, in particular, because totally reflective inclined surfaces are used instead of mirror layers. However, one disadvantage of Porro prisms is the significant offset between the incident and the emerging beam which results in a correspondingly bulky design such as, for example, the z-shaped body structure of the two halves of classic binoculars.

SUMMARY

The invention creates a Porro prism in which the offset of the beam during its passage through the prism is reduced in comparison with conventional designs. In a Porro prism of the initially cited type, this is attained in that the connecting surface lies oblique to the optical axes of those sections of the beam path that penetrate the exposed entry and exit surfaces of the reversing prisms.

Due to the oblique arrangement of the connecting surface, the cross section of the light that respectively is incident on and emerges from the outer (exposed) entry and exit surfaces is preserved while a continuous reduction or narrowing of the beam cross section toward the center of the prism is achieved, which on the one hand causes the beam offset of the Porro prism to be reduced because the beam cross sections that are narrowed in opposite directions lie closer to one another than in a conventional Porro prism, and on the other hand does not lead to a noteworthy impairment at the conventional installation site of the prism between the lens and the focal point in binoculars or a telescope, but merely to a slight decrease in brightness toward the edge of the image field ("vignetting"). Consequently, a reduced beam offset can be achieved without significant disadvantages.

In some embodiments of the invention the reversing prisms are shifted parallel to one another along their connecting surface in such a direction that the aforementioned optical axes are moved closer to one another. In this way, the beam offset can be additionally reduced—with a slightly elongated structural shape—while the beam passes through the Porro prism.

In some embodiments of the invention, it is proposed that the beam path section extending from one reversing prism to the other reversing prism lies oblique to the aforementioned optical axes; and/or that the inclined surfaces of the reversing prisms are positioned such that the first two sections of the beam path and the last two sections of the beam path respectively lie in planes that are inclined relative to one another. Due to this, the aforementioned optical axes can be respectively moved even closer to one another, i.e., the beam offset can be additionally reduced, ideally even to zero. In order to achieve an exact two-fold image rotation of respectively 180°, i.e., once vertically by 180° and once horizontally by 180°, both inclined surfaces of both reversing prisms are preferably adapted to one another with respect to their inclination.

Due to the oblique arrangement of the connecting surface, the central section of the beam path usually no longer passes through said connecting surface perpendicularly. According to some embodiments of the invention, the connecting surface therefore can be used for decoupling and/or coupling part of the light from/into the beam path by making the connecting surface partially reflective. In this way, it is possible, for example, to decouple a measuring beam for a measuring instrument from the beam path or to couple an image of a display into the beam path. If the coupling and decoupling angles are chosen accordingly, it can be ensured that the coupled or decoupled light beam perpendicularly emerges in a lossless fashion from one of the surfaces of the reversing prisms.

BRIEF DESCRIPTION OF THE DRAWINGS

FIG. 4 shows a front view (FIG. 4a), a top view (FIG. 4b) and a side view (FIG. 4c) of a third embodiment of a Porro prism according to the invention.

DETAILED DESCRIPTION

Figure 1D:
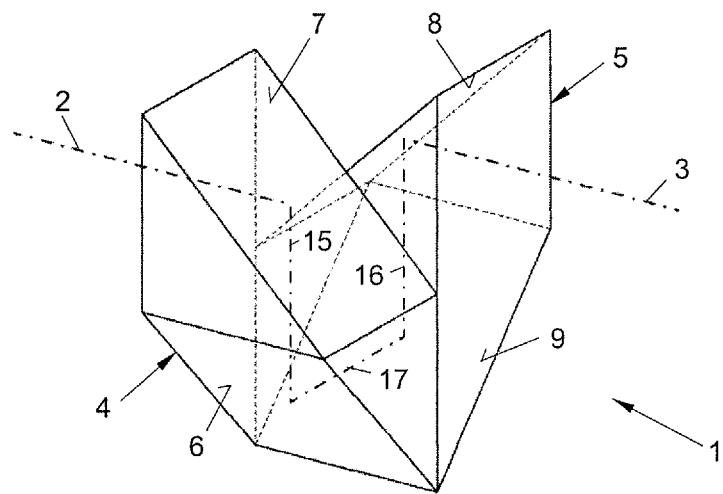
FIG. 1 shows a front view (FIG. 1a), a top view (FIG. 1b), a side view (FIG. 1c) and a perspective representation (FIG. 1d) of a Porro prism of the second type according to the state of the art.
Figure 1B:
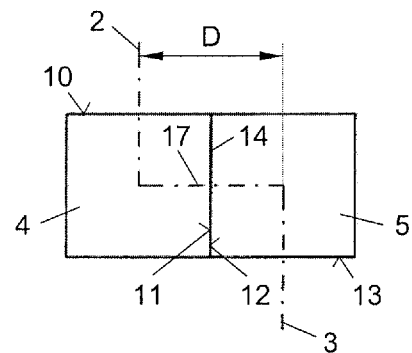
Figure 1C:
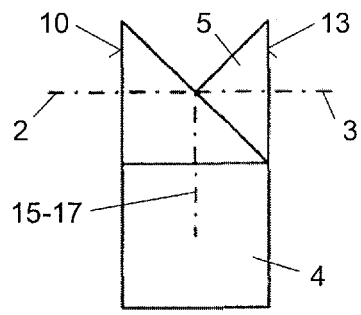
Figure 1A:
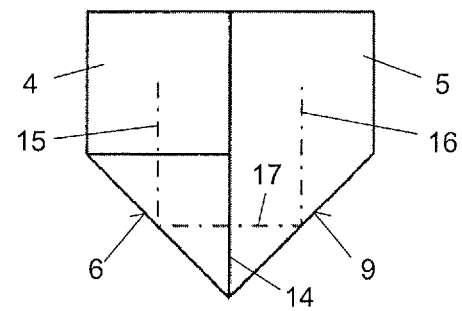
Figure 2D:
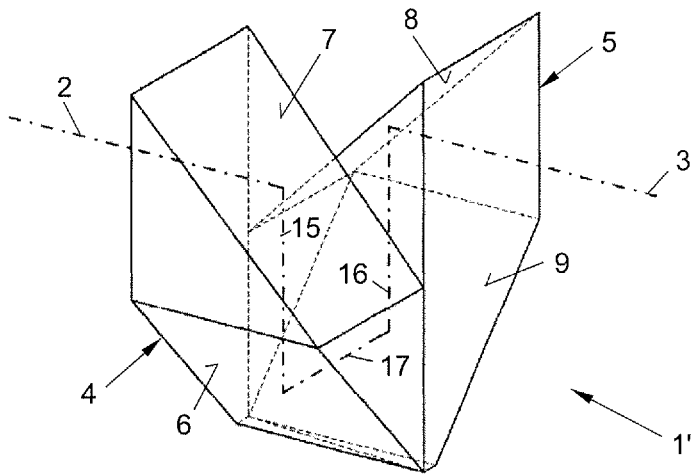
FIG. 2 shows a front view (FIG. 2a), a top view (FIG. 2b), a side view (FIG. 2c) and a perspective representation (FIG. 2d) of a first embodiment of a Porro prism according to the invention.
Figure 2B:
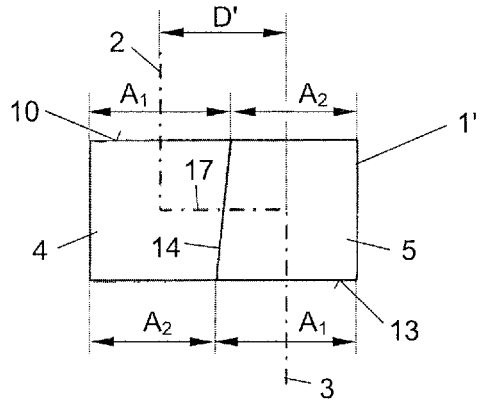
Figure 2C:
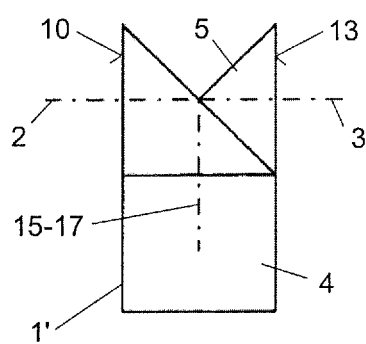
Figure 2A:
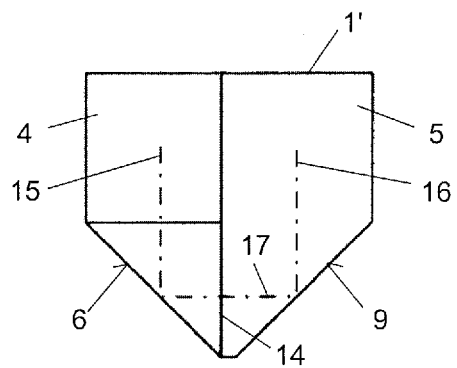

FIG. 1 shows a Porro prism 1, namely a so-called "Porro prism of the second type," in which the incident and emerging beams of the Porro prism, or more specifically the optical axes 2, 3 of the incident and emerging sections of the beam path, extend parallel to one another and are subject to a parallel offset D.

A Porro prism of the second type like the Porro prism 1 may be composed, for example, of two interconnected reversing prisms 4, 5 that respectively feature two reflective inclined surfaces 6, 7 and 8, 9 that lie between their entry and exit surfaces 10, 11 and 12, 13, respectively.

The inclined surfaces 6-9 are preferably totally reflective, i.e., they reflect at the prism material-air boundary layer due to the physical effect of total reflection, but may also be provided with a separate mirror layer. The term "reflective inclined surfaces" used in this application includes both variations, i.e., total reflection as well as mirror layer reflection.

The inclined surfaces 6, 7 and 8, 9 in each individual reversing prism 4, 5 of the Porro prism according to FIG. 1 are arranged angular to one another in such a way that the reflections take place thereon in planes that lie perpendicular to one another. The exit surface 11 of one reversing prism 4 directly adjoins the entry surface 12 of the other reversing prism 5 and, e.g., is transparently cemented thereto or realized integrally therewith. The entry and exit surfaces 11, 12 interconnected in this manner therefore form a connecting surface 14 between the reversing prisms 4, 5.

Due to the described arrangement, the beam path extends through the Porro prism 1 as shown in FIGS. 1*a* to 1*d*, i.e., with two sections 15, 16 that respectively follow its incident and emerging sections 2, 3 and respectively extend between the inclined surfaces 6, 7 and 8, 9 in each reversing prism 4, 5, as well as a central section 17 that extends from the inclined surface 6 of one reversing prism 4 to the inclined surface 9 of the other reversing prism 5 through the connecting surface 14.

FIG. 2 shows a first embodiment of a Porro prism 1' according to the invention. Components that are identical to those shown in FIG. 1 are identified with the same reference symbols and only the differences between the inventive Porro prism and the conventional Porro prism 1 according to FIG. 1 are discussed below.

The connecting surface 14 of the Porro prism 1' is arranged oblique to the optical axes 2, 3 of the incident and emerging beams, i.e., to the sections 2, 3 of the beam path 2-15-17-16-3 through the Porro prism 1' that extend through its exposed (non-connected) entry and exit surfaces 10, 13. In this way, the offset D between the incident and emerging optical axes 2, 3 can be reduced to a lower offset D' as illustrated, in particular, in FIG. 2*b*. The entry and exit cross sections $A_1$ on the entry and exit surfaces 10, 13 remain identical to those of the conventional Porro prism 1 according to FIG. 1, but the inclined surfaces 7, 8 and 6, 9 are oppositely tapered to reduced cross sections $A_2$ in a trapezoidal fashion—in the direction of the beam path toward the interior of the prism. Although this results in a reduction of the available beam cross section or beam diameter as the light penetrates farther into the Porro prism 1', it merely leads to so-called "vignetting," i.e., a slight decrease in brightness toward the edge of the image field, at the location in conventional telescopes, binoculars or the like, in which such prisms are used as reversing systems.

FIG. 3 shows an additional development of the Porro prism 1' according to FIG. 2, namely a Porro prism 1" that results in an even smaller axial offset D" of the beam path 2-15-17-16-3. Components identical to those in FIGS. 1 and 2 are once again identified with the same reference symbols and only the differences between this additional development and the embodiment according to FIG. 2 are discussed below.

In the embodiment 1" according to FIG. 3, the two reversing prisms 4, 5 are shifted parallel to one another along their oblique connecting surface 14, namely in the direction indicated with the arrows 18, 19, wherein this leads to an increased structural length of the Porro prism 1", but reduces the beam offset D" between the incident and emerging optical axes 2, 3 even further. In order to prevent the beam cross section from being unnecessarily narrowed in the center of the Porro prism 1", the inclined surfaces 6, 7 and 8, 9 of the reversing prisms 4, 5 are adjusted in such a way that the reflection on the inclined surfaces 7, 8 no longer takes place at an angle of 45° referred to the perpendicular on the surface, but rather a greater angle of, e.g., 50° to 60° referred to the perpendicular. In this way, the beam path is deflected by more than 90° on the inclined surfaces 7, 8. The inclined surfaces 7, 8 are adapted to one another in such a way that the central section 17 no longer extends perpendicularly to the incident and emerging optical axes 2, 3, but rather obliquely; see FIG. 3*b*. Consequently, the beam path sections 15, 16 in the reversing prisms 4, 5 no longer lie parallel to one another. However, they lie in two parallel planes that are respectively defined by the sections 2 and 15 on the one hand and 3 and 16 on the other hand.

FIG. 4 shows another modification of the Porro prism according to FIG. 3 in the form of a Porro prism 1''', in which the beam offset D''' is reduced even further. Components identical to those in FIGS. 1 to 3 are once again identified by the same reference symbols and only the differences between this embodiment and the Porro prism 1" according to FIG. 3 are discussed below.

Figure 3D:
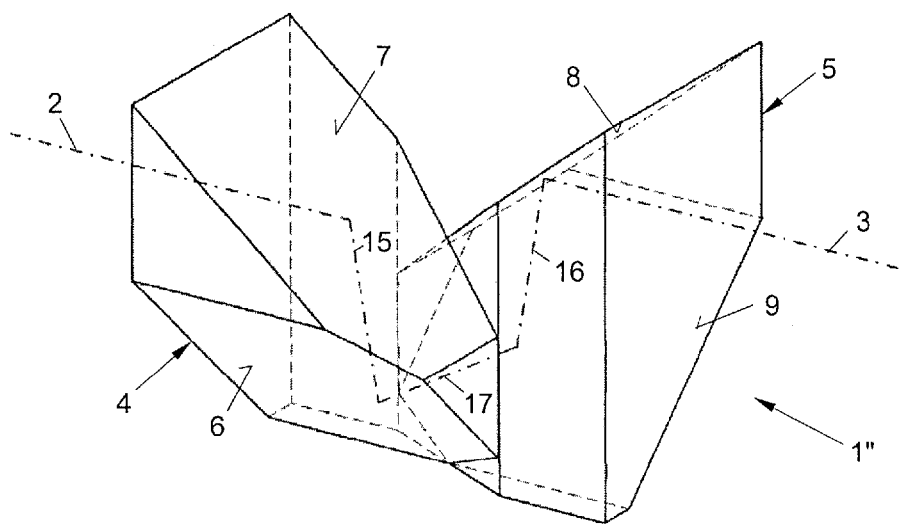
FIG. 3 shows a front view (FIG. 3a), a top view (FIG. 3b), a side view (FIG. 3c) and a perspective representation (FIG. 3d) of a second embodiment of a Porro prism according to the invention.
Figure 3B:
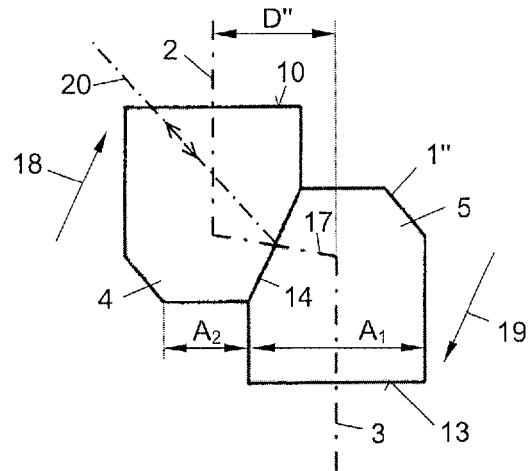
Figure 3C:
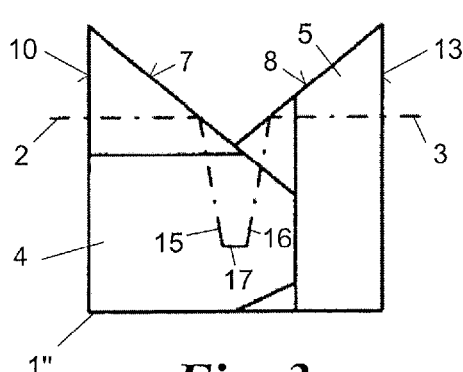
Figure 3A:
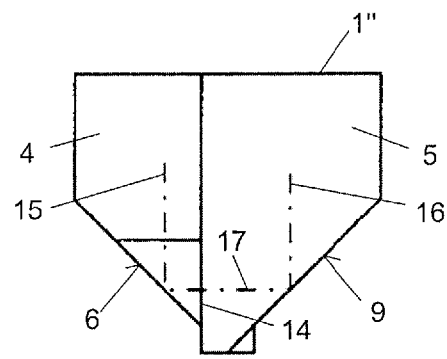

In the embodiment according to FIG. 4, all four inclined surfaces 6-9 are adjusted in such a way that the beam sections 15, 16 no longer lie in parallel planes—referred to their respectively adjoining beam sections 2, 3; see FIG. 4*a* in comparison with FIG. 3*a*.

Due to the inclination of the inclined surfaces 6-9, the beam path 2-15-17-16-3 through the Porro prism 1''' is folded in such a way that a minimal or ideally zero beam offset D''' is achieved between the incident and emerging optical axis 2, 3. In this case, it is merely required to take into consideration the critical angle of the total reflection on the inclined surfaces 6-9 (if they reflect by means of total reflection) and the boundary condition that an exact two-fold image rotation by respectively 180° is achieved, i.e., once vertically by 180° and once horizontally by 180°.

In all embodiments of FIGS. 2-4, in which the beam path center section 17 does not perpendicularly extend through the connecting surface 14, the connecting surface 17 can be used for coupling and decoupling part of the light into/out of the beam path; in this respect, see the example coupling or decoupling beam 20 in FIG. 3*b*. For this purpose, the connecting surface 17 may be provided with a partially reflective (partially transparent) coating—e.g., prior to the assembly of the two reversing prisms 4, 5 into the Porro prism 1', 1", 1'''. The coupling or decoupling beam 20 can be reflected and the external shape of the reversing prisms 4, 5 can be realized in such a way that the coupling or decoupling beam perpendicularly penetrates one of the outer surfaces of the reversing prisms 4 and 5 in order to be incident or emerge with the lowest loss possible. The coupling or decoupling beam 20 makes it possible, for example, to decouple the measuring beam for a measuring instrument from the beam path or to couple a light beam of a display unit into the beam path.

It goes without saying that the illustrated Porro prisms 1', 1", 1''' do not necessarily have to be assembled or composed of only two reversing prisms 4, 5 of the shape shown, but also of other geometric bodies, as long as the described reflective inclined surfaces 6 to 9 and the beam path sections 2, 15, 17, 16, 3 are realized. In an integral design or another segmenting of the Porro prisms 1', 1", 1''', the connecting surface 14 accordingly may also consist of a merely virtual (imaginary) connecting surface between two functional reversing prisms 4, 5 rather than a physical cemented surface. Any known optical material such as glass, plastic, crystals, etc., may be used as material for the reversing prisms 4, 5.

The invention is not restricted to the embodiments shown, but rather includes all variations and modifications within the scope of the following claims.

What is claimed is:

1. A Porro prism comprising: at least two reversing prisms interconnected in the form of a Porro prism of the second type wherein optical axes of incident and emerging sections of a beam path extend parallel to one another, each reversing prism providing two reflective inclined surfaces for a beam path between an entry surface and an exit surface, wherein the exit surface of one reversing prism and the entry surface of the other reversing prism form their respective connecting surface, and wherein the connecting surface lies oblique to optical axes of those sections of the beam path that penetrate the exposed entry and exit surfaces of the reversing prisms to narrow the beam cross section toward the center of the prism thereby reducing a beam offset between incident and emerging optical axes of the beam path.

2. The Porro prism according to claim 1, wherein the reversing prisms are shifted parallel to one another along their connecting surface in a direction which moves the aforementioned optical axes closer to one another.

3. The Porro prism according to claim 1, wherein the beam path section extending from one reversing prism to the other reversing prism lies oblique to the aforementioned optical axes.

4. The Porro prism according to claim 2, wherein the beam path section extending from one reversing prism to the other reversing prism lies oblique to the aforementioned optical axes.

5. The Porro prism according to claim 3, wherein the inclined surfaces of the reversing prisms are positioned such that first two sections of the beam path and last two sections of the beam path respectively lie in planes that are inclined relative to one another.

6. The Porro prism according to claim 4, wherein the inclined surfaces of the reversing prisms are positioned such that first two sections of the beam path and last two sections of the beam path respectively lie in planes that are inclined relative to one another.

7. The Porro prism according to one claim 1, wherein the connecting surface is partially reflective in order to decouple or couple a part of light from/into the beam path.

8. The Porro prism according to one claim 2, wherein the connecting surface is partially reflective in order to decouple or couple a part of light from/into the beam path.

* * * * *